United States Patent
Overesch et al.

(10) Patent No.: US 10,593,491 B2
(45) Date of Patent: *Mar. 17, 2020

(54) APPARATUS WITH MEMBRANE PANEL HAVING CLOSE-PROXIMITY COMMUNICATION ANTENNA

(71) Applicant: Illinois Tool Works Inc., Glenview, IL (US)

(72) Inventors: Jeremy Overesch, Neenah, WI (US); Scott Liebert, Freedom, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/373,236

(22) Filed: Apr. 2, 2019

(65) Prior Publication Data
US 2019/0228928 A1 Jul. 25, 2019

Related U.S. Application Data

(63) Continuation of application No. 15/464,971, filed on Mar. 21, 2017, now Pat. No. 10,249,456.

(51) Int. Cl.
*H01H 13/702* (2006.01)
*H01Q 1/22* (2006.01)
(Continued)

(52) U.S. Cl.
CPC ........ *H01H 13/702* (2013.01); *G06F 1/1626* (2013.01); *H01Q 1/2225* (2013.01); *H01Q 1/2291* (2013.01); *H01Q 7/00* (2013.01); *H04B 5/00* (2013.01); *H04B 5/0031* (2013.01); *H04B 5/0062* (2013.01); *H04W 4/80* (2018.02)

(58) Field of Classification Search
CPC ..... H01H 13/702; H04W 4/80; G06F 1/1626; H01Q 1/2291

See application file for complete search history.

(56) References Cited

U.S. PATENT DOCUMENTS

| 7,499,034 B2 * | 3/2009 | Shi | G06F 3/046 345/173 |
| 7,796,122 B2 * | 9/2010 | Shih | G06F 3/046 178/18.07 |

(Continued)

FOREIGN PATENT DOCUMENTS

GB   2519122   4/2015

OTHER PUBLICATIONS

PCT Notification of Transmittal of the International Search Report and the Written Opinion of the International Searching Authority, or the Declaration, International application No. PCT/US2018/022709, dated Jun. 22, 2018, 15 pages.

(Continued)

*Primary Examiner* — Devan A Sandiford
(74) *Attorney, Agent, or Firm* — McAndrews, Held & Malloy, Ltd.

(57) ABSTRACT

Apparatus and methods are disclosed of a membrane panel comprising a close-proximity communication antenna embedded within the membrane panel. In an example, a welding-type system includes a membrane panel with a user interface and a close-proximity communication antenna embedded within the membrane panel.

19 Claims, 3 Drawing Sheets

(51) Int. Cl.
*G06F 1/16* (2006.01)
*H04W 4/80* (2018.01)
*H01Q 7/00* (2006.01)
*H04B 5/00* (2006.01)

(56) References Cited

U.S. PATENT DOCUMENTS

| | | | |
|---|---|---|---|
| 9,734,771 B2* | 8/2017 | Gmyr | G09G 3/36 |
| 2004/0198438 A1* | 10/2004 | Song | G16H 40/63 |
| | | | 455/556.1 |
| 2004/0239642 A1* | 12/2004 | Shi | G06F 3/046 |
| | | | 345/173 |
| 2005/0062725 A1* | 3/2005 | Shih | G06F 3/046 |
| | | | 345/173 |
| 2005/0178835 A1 | 8/2005 | Akiho et al. | |
| 2005/0211476 A1* | 9/2005 | Shi | G06F 3/046 |
| | | | 178/18.07 |
| 2006/0227669 A1* | 10/2006 | Pennaz | G04F 13/04 |
| | | | 368/327 |
| 2008/0191959 A1* | 8/2008 | Koyama | H01Q 1/2225 |
| | | | 343/873 |
| 2008/0308641 A1 | 12/2008 | Finn | |
| 2008/0309581 A1* | 12/2008 | Fujii | H01Q 1/2225 |
| | | | 343/873 |
| 2010/0081375 A1* | 4/2010 | Rosenblatt | G08C 17/02 |
| | | | 455/41.1 |
| 2010/0182207 A1* | 7/2010 | Miyata | H01L 27/13 |
| | | | 343/702 |
| 2010/0260460 A1* | 10/2010 | Harrysson | H01Q 1/1271 |
| | | | 385/119 |
| 2011/0053556 A1* | 3/2011 | Masaryk | G06F 3/03541 |
| | | | 455/406 |
| 2012/0087065 A1* | 4/2012 | Kim | G06F 1/1656 |
| | | | 361/679.01 |
| 2013/0155027 A1* | 6/2013 | Holmgren | G06F 3/0421 |
| | | | 345/175 |
| 2013/0217295 A1* | 8/2013 | Karunaratne | A63H 33/086 |
| | | | 446/124 |
| 2014/0061169 A1* | 3/2014 | Sammons | B23K 9/1006 |
| | | | 219/109 |
| 2014/0227969 A1* | 8/2014 | Fratti | H01Q 1/085 |
| | | | 455/41.1 |
| 2014/0266576 A1* | 9/2014 | Hillen | G07C 9/00111 |
| | | | 340/5.2 |
| 2014/0284323 A1* | 9/2014 | Albrecht | B23K 9/10 |
| | | | 219/660 |
| 2015/0046272 A1* | 2/2015 | Taylor | G06Q 30/04 |
| | | | 705/15 |
| 2015/0097769 A1* | 4/2015 | Russell | G06F 1/1652 |
| | | | 345/156 |
| 2015/0114942 A1 | 4/2015 | Denis et al. | |
| 2016/0014850 A1* | 1/2016 | Verhagen | H05B 6/08 |
| | | | 219/666 |
| 2016/0045971 A1 | 2/2016 | Holverson | |
| 2016/0265976 A1* | 9/2016 | Joyce | G05D 23/27 |
| 2016/0306482 A1* | 10/2016 | Gmyr | G09G 3/36 |
| 2016/0323428 A1 | 11/2016 | Kim et al. | |
| 2017/0050616 A1 | 2/2017 | Liubakka et al. | |

OTHER PUBLICATIONS

PCT, Advance e-mail, Notification conerning Transmittal of Intematioanl Preliminary Report on patentability (Chaper I of the Patent Cooperation Treaty), International application No. PCT/US2018/022709, dated Oct. 3, 2019, 9 pages.

* cited by examiner

US 10,593,491 B2

APPARATUS WITH MEMBRANE PANEL HAVING CLOSE-PROXIMITY COMMUNICATION ANTENNA

CROSS REFERENCE TO RELATED APPLICATIONS

This application is a continuation of U.S. patent application Ser. No. 15/464,971 entitled "APPARATUS WITH MEMBRANE PANEL HAVING CLOSE-PROXIMITY COMMUNICATION ANTENNA," filed Mar. 21, 2017, which is hereby incorporated by reference in its entirety.

BACKGROUND

Wireless technologies allow for communication between devices without the need for physical connections. Some wireless technologies, however, are easily hacked despite implementation of various security measures. One method to ensure secure communication is to limit the distance over which transmissions can travel, requiring each device to be close by. Example close-proximity communications technologies that provide direct communication channels may require a distance between devices of tens of centimeters or fewer. The requirement for such a short distance to communicate provides a benefit to security that wide area wireless communications lack.

Membrane panels can be configured with components, such as electrical switches. These switches can be displayed alongside graphics and/or visual displays (e.g., lighting, video, etc.). Further, membrane panels can be constructed to conceal the switches from environmental contaminants (e.g., water, dust, etc.).

SUMMARY

Apparatuses are disclosed of a membrane panel having close-proximity communication antenna, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
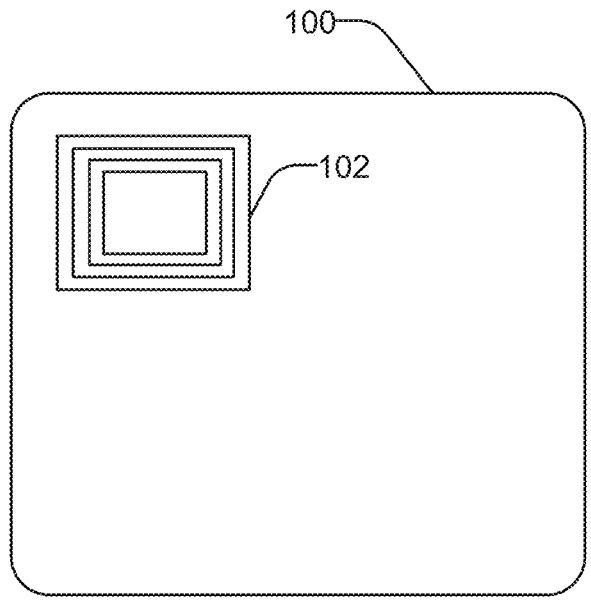
FIG. 1 illustrates an example membrane panel having a close-proximity communication antenna in accordance with aspects of this disclosure.

Disclosed are examples of membrane panels with embedded close-proximity communications antennae embedded therein. The close-proximity communications antenna (e.g., a nearfield communications (NFC) antenna) can be connected to a controller or other circuitry to convey information and commands from devices configured to communicate via close-proximity. An example membrane panel can also include a user interface.

In some examples, a membrane panel can include multiple layers and a variety of controls. For example, a membrane panel can include one membrane layer with an embedded close-proximity antenna, and another membrane switch layer having an electrical switch for controlling a circuit, such as on a user interface of an electronic device. In contrast to mechanical switches typically made of metal and plastic, a membrane switch can be one or more conductive elements printed on a substrate (e.g., polyethylene terephthalate (PET), indium-tin-oxide (ITO), etc.).

In an example, a first layer of a multi-layer membrane panel includes graphics that provide guidance for a user interacting with an interface. A second layer contains an embedded close-proximity communications antenna, and/or a printed circuit, such a containing one or more printed switches. A third layer contains additional functionality, such as additional switches, or provide insulation for the printed circuit elements of the membrane panel. Further, a fourth layer provides structural support for the membrane panel. For instance, the membrane panel may be constructed of a flexible material (e.g., Kapton, polyimide, polyamide or other polymers). In applications where the membrane panel is mounted on a device, for example, the structural layer can provide support for the other layers.

Membrane panels can also be employed in conjunction with other interfaces (e.g., graphical user interfaces (GUI), touch screens, etc.) and display technologies, such as lighted effects for various switches or other graphics on the membrane panel.

Depending on the particular demands of the application, layers of the membrane panel may be made of a variety of materials, and may be joined by a variety of attachments (e.g., mechanical fasteners, adhesives, etc.). Membrane panels advantageously provide an interface that includes information for a user (e.g., GUIs, one or more controls, etc.) as well as being capable of preventing contaminants into the device, while working in conjunction with the various displays and controls. For example, a membrane panel can be partially transparent, allowing a display screen or other visual elements to be visible alongside the membrane switch functions, as well as protected by the layer(s) of the membrane panel. The layers may be configured differently than what is expressly described in the examples. For example, printed circuits, printed switches, insulation, structural support, and/or antennas may be configured for a desired application.

In disclosed examples, a membrane panel incorporates a close-proximity communications antenna. Close-proximity communications encompasses a variety of short-range wireless communication technologies, typically requiring a very small distance (e.g., 10 cm) between transmitter and receiver. For example, near-field communication (NFC) is a communication protocol that enables data transfer between two electronic devices. Often, one device is portable and capable of communicating instructions, such as a smartphone, a tablet, an NFC or radio frequency (RF) tag, or other remote control device. In the example of a smartphone, to establish communication, the smartphone may need to be within 4 cm (1.6 in) of the second device.

Advantageously, NFC devices can communicate without actual contact, avoiding the need for physical ports that could be exposed to environmental damage. NFC devices communicate via electromagnetic induction, such as between loop antennas within a common near field associated with each NFC enabled device for data transfer. The principles upon which NFC devices operate allow for a variety of applications, including small packages and low power.

In some examples, NFC devices can operate in passive and/or active modes. In a passive mode, one NFC device provides a signal to a target device, which can answer the transmission by modulating in response to the first device's magnetic field. In a passive mode, power to operate the target device comes from the electromagnetic field generated from the first device, thus the target device does not require an independent power source. In an active mode, both the signal generating device and the target device communicate by generating their own fields from their own power sources.

Close-proximity communications can also include radio-frequency (RF) transmitters and receivers. For example, radio-frequency identification (RFID) systems employ low-power antenna, such as tags or labels, can be attached to objects to share information, such as identification. Bidirectional radio transmitter and receivers (e.g., interrogators and readers) can be used to send signals to a tag and read a response. Such devices can also be configured for active and/or passive operation.

In a welding-type environment, dust, water, fluctuations in temperature, and other potential sources of damage to equipment are ever-present. The use of a membrane panel serves to protect underlying electronics from contaminants. The further incorporation of a close-proximity communications antenna allows for transfer of information wirelessly. For example, a first device could be a portable computing device (e.g., a smartphone) configured with an interface for inputting commands and/or customizing controls. The second device, such as a welding-type power supply, can be configured to communicate with the first device via close-proximity communications to receive commands and/or share information. Advantageously, the membrane panel can provide a communications channel between devices, as well as protecting internal electronics from environmental damage. Further, the short distance required for devices to communicate can prevent accidental and/or unwanted information transmissions.

Therefore, the membrane panel having a user interface and an embedded close-proximity antenna can provide for increased functionality and secured communications in, for example, a welding-type system.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit" (e.g., controller, control circuit, etc.) includes any analog and/or digital components, power and/or control elements, such as a microprocessor, digital signal processor (DSP), software, and the like, discrete and/or integrated components, or portions and/or combinations thereof.

In an example, a membrane panel includes a user interface and an embedded close-proximity communication antenna. In some examples, the membrane panel can be connected to a controller via an electrical connector to transmit information to and receive information from the close-proximity communication antenna and the membrane panel.

In disclosed examples, the close-proximity communication antenna can be connected to a controller via a first electrical connector, and the membrane panel can be connected to the controller via a second electrical connector.

In an example, the membrane panel includes a first layer with the close-proximity communication antenna, and a second layer with a membrane switch circuit. For instance, both the close-proximity communication antenna and the membrane panel are connected to a controller via an electrical connector.

In another example, the first layer of the membrane panel is connected to a controller via a first electrical connector, and the second layer of the membrane panel is connected to the controller via a second electrical connector, with the membrane switch circuit including signal traces for corresponding electrical switches. In some examples, the electrical switches and the plurality of signal traces are printed on the membrane switch circuit.

In some examples, the membrane panel comprises a flexible substrate. In disclosed examples, a graphic layer overlays a surface of the membrane panel and includes a graphic indicating the location of a corresponding electrical switch on the membrane switch panel. The membrane panel can be mounted to a support layer on a surface of the membrane panel opposite the graphic layer.

In some examples, the close-proximity communication antenna is configured to transmit information to and receive information from a communications device via near field communications (NFC). In examples, the communications device is one of a smartphone, a tablet computer, or a NFC tag.

In disclosed examples, a welding-type system includes a membrane panel with a user interface and a close-proximity communication antenna embedded within the membrane panel. In some examples, the system includes a controller electrically connected to the membrane panel by an electrical connector. In examples, the membrane panel includes a first layer with the close-proximity communication antenna and a second layer with a membrane switch circuit.

In some examples, the system includes a first electrical connector configured to connect the first layer of the membrane panel to a controller, and a second electrical connector configured to connect the second layer of the membrane panel to the controller.

In examples, the close-proximity communications antenna can be coupled to an active close-proximity communications module or a passive close-proximity communications module. In some examples, a controller can control a parameter of the welding-type system based on commands received from the close-proximity communications antenna.

FIG. 1 is an example membrane panel 100 having an embedded close-proximity communication antenna 102 configured to transmit and/or receive data from another device similarly configured. In an example, the membrane panel 100 of FIG. 1 can be configured to connect to an associated device, such as a welding-type power supply (see, e.g., FIG. 4). In such an example, the associated device can transmit and/or receive information from the close-proximity communication antenna 102 via one or more communication channels.

Figure 2:
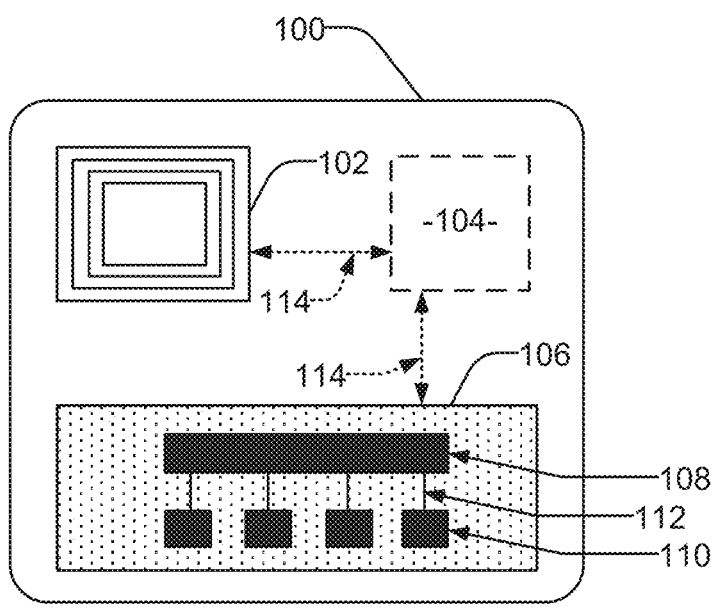
FIG. 2 is another example membrane panel having a close-proximity communication antenna in accordance with aspects of this disclosure.

In another example, shown in FIG. 2, membrane panel 100 includes close-proximity communication antenna 102, as well as a switch panel 106. The switch panel 106 provides additional functionality, such as a display 108 and one or more electrical switches 110. The electrical switches 110 can include various types of switch controls, for example, capacitive-type switches, pressure switches, touch-enabled switches, mechanical switches, as well as other types of switches and/or controls. The switch panel 106 can include one or more electrical signal traces 112 to provide communication between various components (e.g., the switches 110, display 108, etc.). In some examples, the switches 110 and the electrical signal traces 112 are printed on a membrane switch circuit of membrane panel 100. The close-proximity communication antenna 102 and the switch panel 106 can be configured to connect to one or more controllers 104, such as a processor or microcontroller, a programmable logic circuit, a system-on-chip, a programmable logic device, and/or any other type of logic circuit, via one or more connectors 114. In an example, the controller 104 is embedded in the membrane panel 100. In some examples, the controller 104 can be located separately from the membrane panel 100, such as a welding-type power supply (see, e.g., FIG. 4). One or more of the close-proximity communication antenna 102 and the switch panel 106 can be connected to the controller 104 via an electrical connection (e.g., a ribbon cable, a wireless channel, etc.).

In an example, each of the close-proximity communication antenna 102 and the switch panel 106 have a dedicated connection 114 with a controller 104, or can have a dedicated connection 114 to separate controllers (i.e. a controller for each device). In other examples, a single connection 114 provides a communication path for both the close-proximity communication antenna 102 and the switch panel 106 to the controller 104. In some examples, connection 114 can additionally or alternatively be configured in accordance with a wireless protocol. Therefore, the controller 104 can communicate with a device (see, e.g., welding-type power supply of FIG. 4) to transmit and/or receive data via the close-proximity communication antenna 102 and the one or more switches 110.

Figure 3:
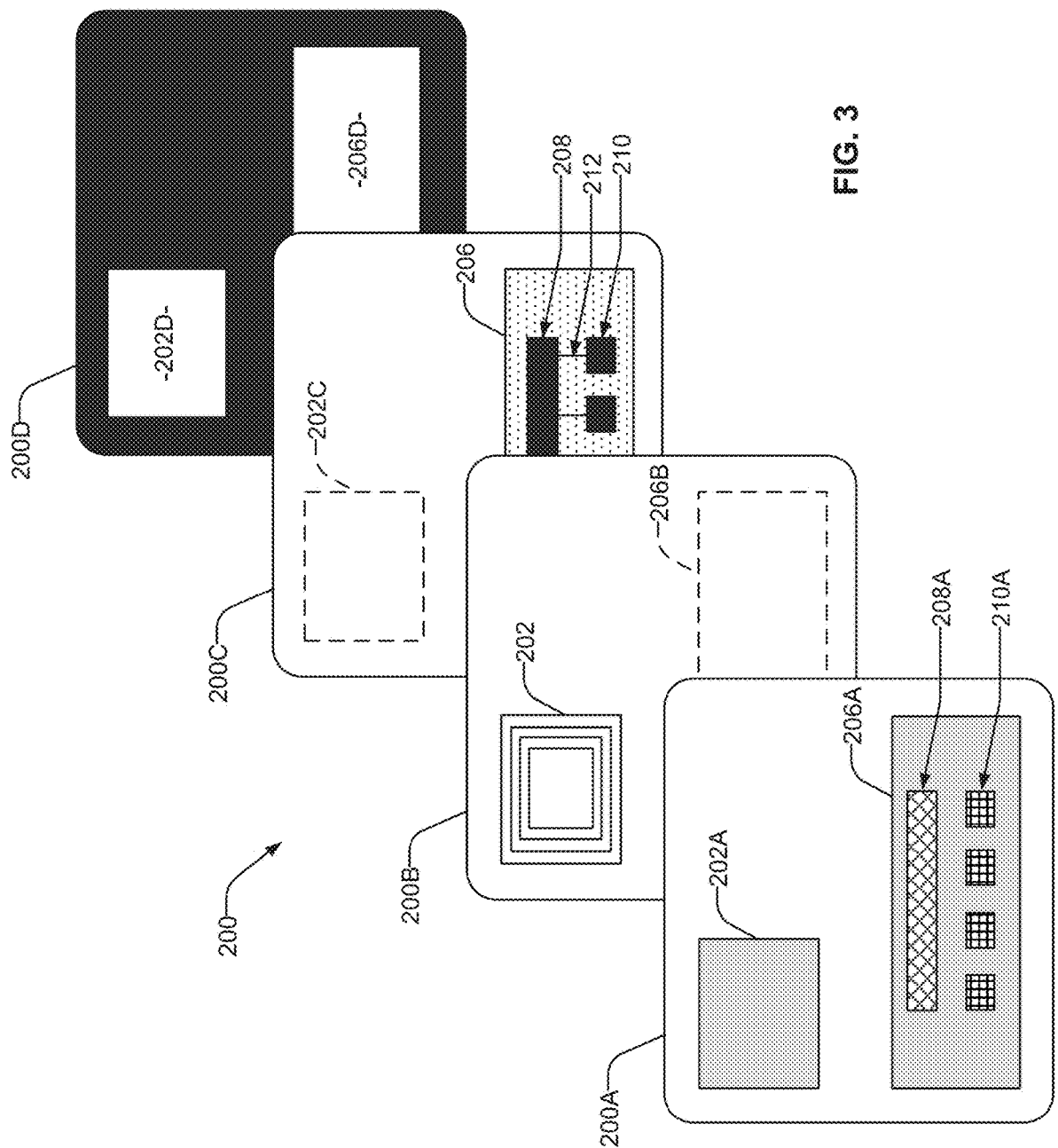
FIG. 3 is an example layered membrane panel having a close-proximity communication antenna in accordance with aspects of this disclosure.

FIG. 3 illustrates an example membrane panel with multiple layers, 200A, 200B, 200C and 200D. First panel layer 200A provides one or more graphics to indicate a location and/or a function(s) associated with the membrane panel. For example, an antenna graphic 202A can correspond to a location of an underlying close-proximity antenna, such as antenna 202. Additionally, switch panel graphic 206A can include a display graphic 208A, such as a transparent portion to reveal a light and/or video display from, for example, display 208. Switch graphic 210A can similarly correspond to a location and/or identify a function of the switches 210. The first panel layer 200A can further be configured as a solid sheet of a protective material (e.g., polymers, PET, ITO, etc.) to protect the underlying panel layers 200B, 200C and 200D.

The second and third panel layers 200B and 200C are configured as membrane switch circuit layers to include one or more devices. In an example, the second panel layer 200B has an embedded close-proximity antenna 202. In some examples, an area 206B can be cut away or voided to allow for unobstructed access and/or contact between switch panel 206 located on the third panel layer 200C and the corresponding switch panel graphic 206A of first panel layer 200A. The third panel layer 200C can similarly cut out an area 202C corresponding to the antenna 202. In this example, access through third panel layer 200C allows unobstructed access through fourth panel layer 200D, configured as a structural support (e.g., a substrate, frame, etc.).

Figure 4:
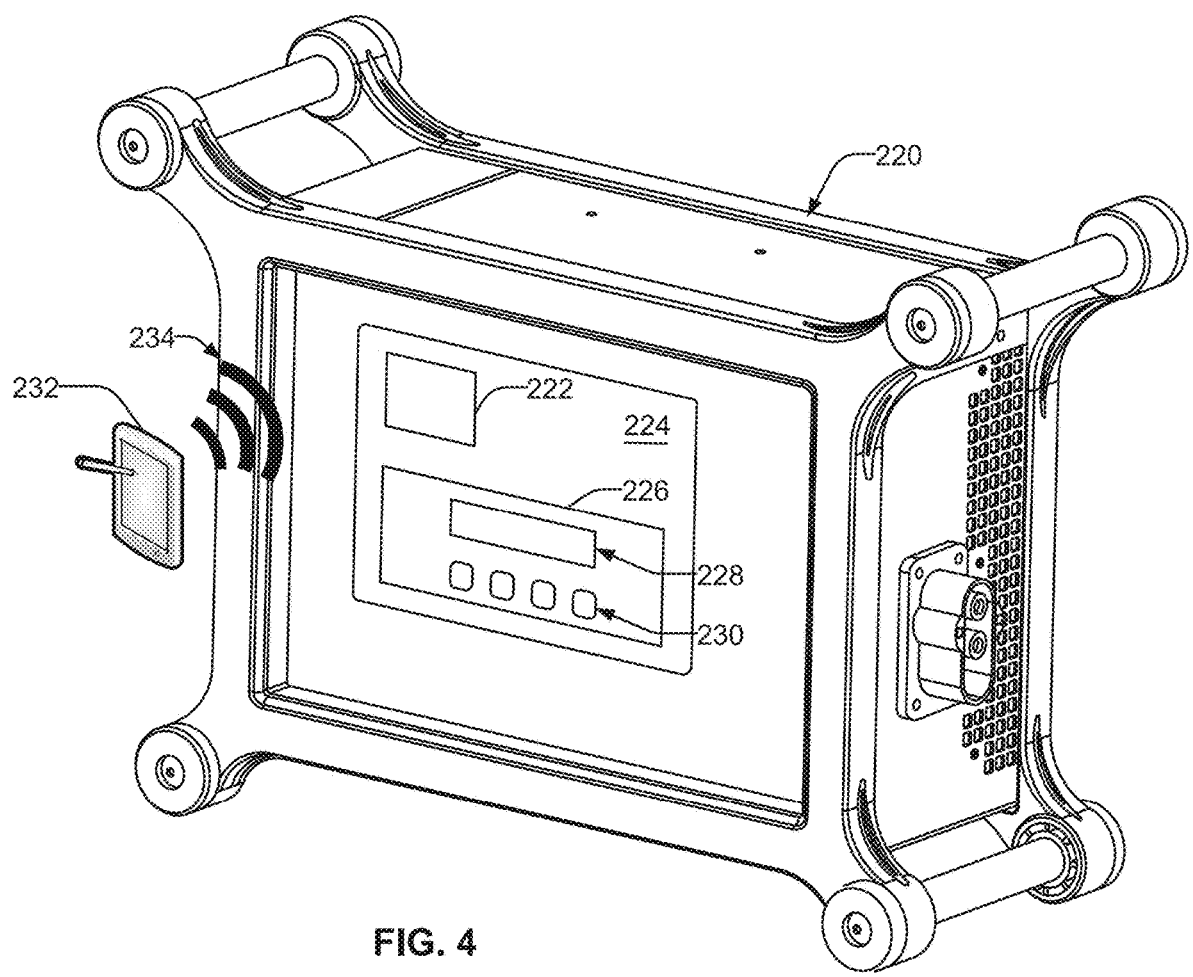
FIG. 4 illustrates an example welding-type power supply that includes a membrane panel having a close-proximity communication antenna in accordance with aspects of this disclosure.

The fourth switch panel layer 200D includes cut out areas 202D and 206D, corresponding to the antenna 202 and switch panel 206, to provide access to electronics (e.g., the controller 104 of FIG. 2) that may be located on the interior of a device upon which the membrane panel is mounted (e.g., device 220 of FIG. 4). Thus, connectors (e.g., connectors 114 of FIG. 2) can link the antenna 202 and switch panel 206 to a controller (e.g., controller 104 of FIG. 2) to transmit and/or receive data. Additionally or alternatively, supplemental functions can be included on one or more of the panel layers 200A, 200B, 200C and 200D, or the devices on separate layers (e.g., the antenna 202 and the switch panel 206) can be combined into a single layer. Further, the panel layer 200D can be configured as a flexible or a rigid substrate, and the panel layers 200A-C can be mounted thereon.

FIG. 4 illustrates an example welding-type power supply 220 in accordance with an aspect of the present disclosure. As shown, the welding-type power supply 220 (e.g., an induction heating power source) includes a membrane panel 224 with an embedded close-proximity antenna 222. Additionally, a switch panel 226 includes a display 228 and one or more switches 230. A portable computing device 232 is configured to transmit and/or receive wireless signals 234 to communicate with the welding-type power supply 220. In an example, the portable computing device 232 is brought with a small distance (e.g., 10 cm) of the close-proximity antenna 222 in order to initiate secure communications.

In some examples, both the portable computing device 232 and the close-proximity antenna 222 can be configured for active communications. In other examples, one can be configured for passive communication while the other is active. In each example, once communication has been established, information can be shared between devices. For instance, a user can provide a set of instructions on the portable computing device 232 which can command the welding-type power supply 220 to operate in accordance with those instructions (e.g., to change a welding parameter, a power output level, a welding type or mode, etc.).

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A multilayer membrane panel user interface comprising:
   a first layer that includes a close-proximity communication antenna embedded within the membrane panel; and
   a second layer that includes a switch panel comprising a graphical user interfaces (GUI).

2. The interface of claim 1, further comprising one or more electrical switches.

3. The interface of claim 2, wherein each Switch panel graphic can include a display graphic, Switch graphic can similarly correspond to a location or identify a function of the one or more electrical switches.

4. The interface of claim 3, wherein the second layer comprises one or more transparent portions to reveal a lighted indicator or an identifying graphic associated with the one or more electrical switches.

5. The interface of claim 2, wherein the second layer comprises a plurality of signal traces for corresponding electrical switches.

6. The interface of claim 5, wherein the one or more electrical switches and the plurality of signal traces are printed on the second layer.

7. The interface of claim 2, wherein both the close-proximity communication antenna and the one or more electrical switches are connected to a controller via an electrical connector.

8. The interface of claim 2, further comprising an insulating layer to protect the close-proximity communication antenna or the one or more electrical switches.

9. The interface of claim 2, wherein the close-proximity communication antenna is configured to transmit information to and receive information from a communications device via near field communications (NFC).

10. The interface of claim 1, wherein the GUI comprises an antenna graphic corresponding to a location of an underlying close-proximity antenna.

11. The interface of claim 1, wherein the GUI is a touch screen enabled.

12. A welding-type system comprising a multilayer membrane panel user interface comprising:
    a close-proximity communication antenna embedded within the membrane panel; and
    a switch panel comprising one or more switches connected to a display via one or more electrical signal traces, wherein the welding-type system is configured to transmit and receive information via the close-proximity communication antenna or the one or more switches.

13. The welding-type system of claim 12, wherein the one or more switches include one or more of a capacitive-type switch, a pressure switch, a touch-enabled switch, or a mechanical switch.

14. The welding-type system of claim 12, wherein the one or more switches and the one or more electrical signal traces are printed on the switch panel.

15. The welding-type system of claim 14, wherein the close-proximity communication antenna and the switch panel are configured to connect to one or more controllers via the one or more electrical signal traces.

16. The welding-type system of claim 12, wherein the controller is embedded in the membrane panel.

17. The welding-type system of claim 12, wherein one or more of the close- proximity communication antenna and the switch panel are connected to the controller via an electrical connection.

18. The welding-type system of claim 17, wherein the electrical connection is one or more of a ribbon cable or a wireless channel.

19. The welding-type system of claim 12, further comprising a panel layer configured as a protective material to protect the underlying panel layers.

* * * * *